United States Patent
Hamada

(10) Patent No.: US 10,328,857 B2
(45) Date of Patent: Jun. 25, 2019

(54) DOOR MIRROR DEVICE

(71) Applicant: KABUSHIKI KAISHA TOKAI-RIKA-DENKI-SEISAKUSHO, Aichi-ken (JP)

(72) Inventor: Takehiro Hamada, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 18 days.

(21) Appl. No.: 15/612,378

(22) Filed: Jun. 2, 2017

(65) Prior Publication Data
US 2017/0355309 A1    Dec. 14, 2017

(30) Foreign Application Priority Data
Jun. 10, 2016    (JP) .................................. 2016-116483

(51) Int. Cl.
*B60R 1/06*      (2006.01)
*G02B 7/182*     (2006.01)

(52) U.S. Cl.
CPC ................ *B60R 1/06* (2013.01); *G02B 7/182* (2013.01)

(58) Field of Classification Search
CPC ............ B60R 1/006; B60R 1/06; G02B 7/182
USPC ......................................................... 359/871
See application file for complete search history.

(56) References Cited

U.S. PATENT DOCUMENTS

| | | | | |
|---|---|---|---|---|
| 5,245,480 A | * | 9/1993 | Polzer ........................ | B60R 1/06 248/479 |
| 5,781,353 A | * | 7/1998 | Seubert ...................... | B60R 1/06 248/478 |
| 2003/0070390 A1 | | 4/2003 | Dunn | |
| 2011/0051444 A1 | | 3/2011 | Murata | |
| 2011/0205747 A1 | | 8/2011 | Suzuki et al. | |

FOREIGN PATENT DOCUMENTS

| | | |
|---|---|---|
| JP | 2009-035078 A | 2/2009 |
| JP | 2009-046037 A | 3/2009 |
| JP | 2011-051436 A | 3/2011 |
| JP | 2011-173572 A | 9/2011 |
| JP | 2013-001191 A | 1/2013 |

OTHER PUBLICATIONS

Office Action issued in the corresponding Japanese Application No. 2016-116483 dated Apr. 24, 2018.

* cited by examiner

*Primary Examiner* — Evan P Dzierzynski
*Assistant Examiner* — Mitchell T Oestreich
(74) *Attorney, Agent, or Firm* — Roberts Mlotkowski Safran Cole & Calderon P.C.

(57) ABSTRACT

A door mirror includes a first attachment section in which an abutting portion is provided at a plating visor so as to extend along a vehicle up-down direction, and in which a restricting portion that abuts the abutting portion is provided at a visor cover; and a second attachment section in which an engagement portion is provided at the plating visor so as to extend along the vehicle up-down direction, and in which a catch portion that engages with the engagement portion is provided at the visor cover.

14 Claims, 8 Drawing Sheets

DOOR MIRROR DEVICE

CROSS-REFERENCE TO RELATED APPLICATION

This application claims priority under 35 USC 119 from Japanese Patent Application No. 2016-116483 filed Jun. 10, 2016, the disclosure of which is incorporated by reference herein.

BACKGROUND

Field of the Invention

The present invention relates to a door mirror device.

Related Art

Japanese Patent Application Laid-Open (JP-A) No. 2013-1191 describes a panel attachment structure for a vehicle door mirror. In this vehicle door mirror panel attachment structure, an engagement claw and a reference pin of an underpanel are respectively engaged with an engagement hole and a pin hole of a visor to fix the underpanel to the visor.

When providing a structure for attaching a visor and an underpanel together, it is desirable for the attachment structure to be made small in size.

SUMMARY

In consideration of the above circumstances, a door mirror device in which a structure for attaching a first cover and a second cover together can be made small in size is obtained.

A door mirror device according to a first aspect includes: a first cover that configures a casing covering a mirror provided at a vehicle door; a second cover that configures the casing, that is provided alongside the first cover in an in-plane direction of the casing, and that faces the first cover in a plate thickness direction of the casing; a first attachment section that is configured to include an abutting portion provided at one of the first cover or the second cover so as to extend along the in-plane direction of the casing, and a restricting portion provided at the other of the first cover or the second cover, the restricting portion abutting the abutting portion such that movement of the first cover with respect to the second cover in the plate thickness direction of the casing is restricted; and a second attachment section that is configured to include an engagement portion provided at one of the first cover or the second cover so as to extend along the in-plane direction of the casing, and a catch portion provided at the other of the first cover or the second cover, the catch portion engaging with the engagement portion such that movement of the first cover with respect to the second cover in the in-plane direction of the casing is stopped.

According to the first aspect, the first cover and the second cover configure the casing, and the casing covers the mirror provided at the vehicle door. The first cover and the second cover are provided alongside each other in the in-plane direction of the casing, and face each other in the plate thickness direction of the casing. In the first attachment section, the abutting portion is provided at one of the first cover or the second cover, and the restricting portion is provided at the other of the first cover or the second cover. Movement of the first cover with respect to the second cover in the plate thickness direction of the casing is restricted by the abutting portion and the restricting portion abutting. In the second attachment section, the engagement portion is provided at one of the first cover or the second cover, and the catch portion is provided at the other of the first cover or the second cover. Movement of the first cover with respect to the second cover in the in-plane direction of the casing is stopped by the engagement portion and the catch portion engaging.

Note that the abutting portion and the engagement portion are provided extending along the in-plane direction of the casing. Accordingly, the amount that the first attachment section and the second attachment section project out in the plate thickness direction of the casing can be reduced.

A second aspect is the door mirror device according to the first aspect, further including a closing portion that is provided at the first cover or the second cover, and that closes an entire gap between the first cover and the second cover in the in-plane direction of the casing.

According to the second aspect, the closing portion is provided at the first cover or the second cover. The closing portion closes off the entirety of the gap between the first cover and the second cover in the in-plane direction of the casing. Accordingly, as the closing portion appears to be uniform between the first cover and the second cover, the portion between the first cover and the second cover appears to be uniform A third aspect is the door mirror device according to the first aspect or the second aspect, further including projection portions that are respectively provided at the first cover and the second cover, the projection portions projecting in the in-plane direction of the casing and facing each other in the plate thickness direction of the casing.

According to the third aspect, the projection portions are respectively provided at the first cover and the second cover. The projection portions each project out in the in-plane direction of the casing and face each other in the plate thickness direction of the casing. Accordingly, it is difficult for wind to flow between the first cover and the second cover while the vehicle is traveling, enabling wind noise to be suppressed.

A fourth aspect is the door mirror device according to any one of the first aspect to the third aspect, wherein the first cover and the second cover are separated from each other at locations other than an abutting portion of the abutting portion and the restricting portion and an engaging portion of the engagement portion and the catch portion.

According to the fourth aspect, the first cover and the second cover are separated from each other at locations other than the abutting portion of the abutting portion and the restricting portion and the engaging portion of the engagement portion and the catch portion. Accordingly, at locations other than the abutting portion of the abutting portion and the restricting portion and the engaging portion of the engagement portion and the catch portion, even when at least one of the first cover or the second cover has deformed, mutual interference between the first cover and the second cover such that assembly is not possible can be suppressed.

A fifth aspect is the door mirror device according to any one of the first aspect to the fourth aspect, further including an attachment body that is attached to at least one of the first cover or the second cover, and that is provided with an elastic body; and a suppression portion that is provided at one of the first cover or the second cover, and that is abutted by the elastic body.

According to the fifth aspect, the attachment body is attached to at least one of the first cover or the second cover, and the attachment body is provided with the elastic body. The suppression portion is provided at the first cover or the second cover, and the suppression portion is abutted by the elastic body. Accordingly, chattering of the first cover or the second cover can be suppressed by reaction force from the elastic body.

The door mirror device according to the first aspect has the excellent advantageous effect of enabling the attachment structure to be made small in size.

The door mirror device according to the second aspect has the excellent advantageous effect of enabling reduction in the quality of the external appearance to be suppressed.

The door mirror device according to the third aspect has the excellent advantageous effect of enabling wind noise to be suppressed.

The door mirror device according to the fourth aspect has the excellent advantageous effect of enabling the ease of an assembly operation to be improved.

The door mirror device according to the fifth aspect has the excellent advantageous effect of enabling the generation of noise to be suppressed.

BRIEF DESCRIPTION OF THE DRAWINGS

Exemplary embodiments will be described in detail with reference to the following figures, wherein.

DETAILED DESCRIPTION

First Exemplary Embodiment

Explanation follows regarding a first exemplary embodiment of a door mirror device, with reference to FIG. 1 to FIG. 5.

Figure 1:
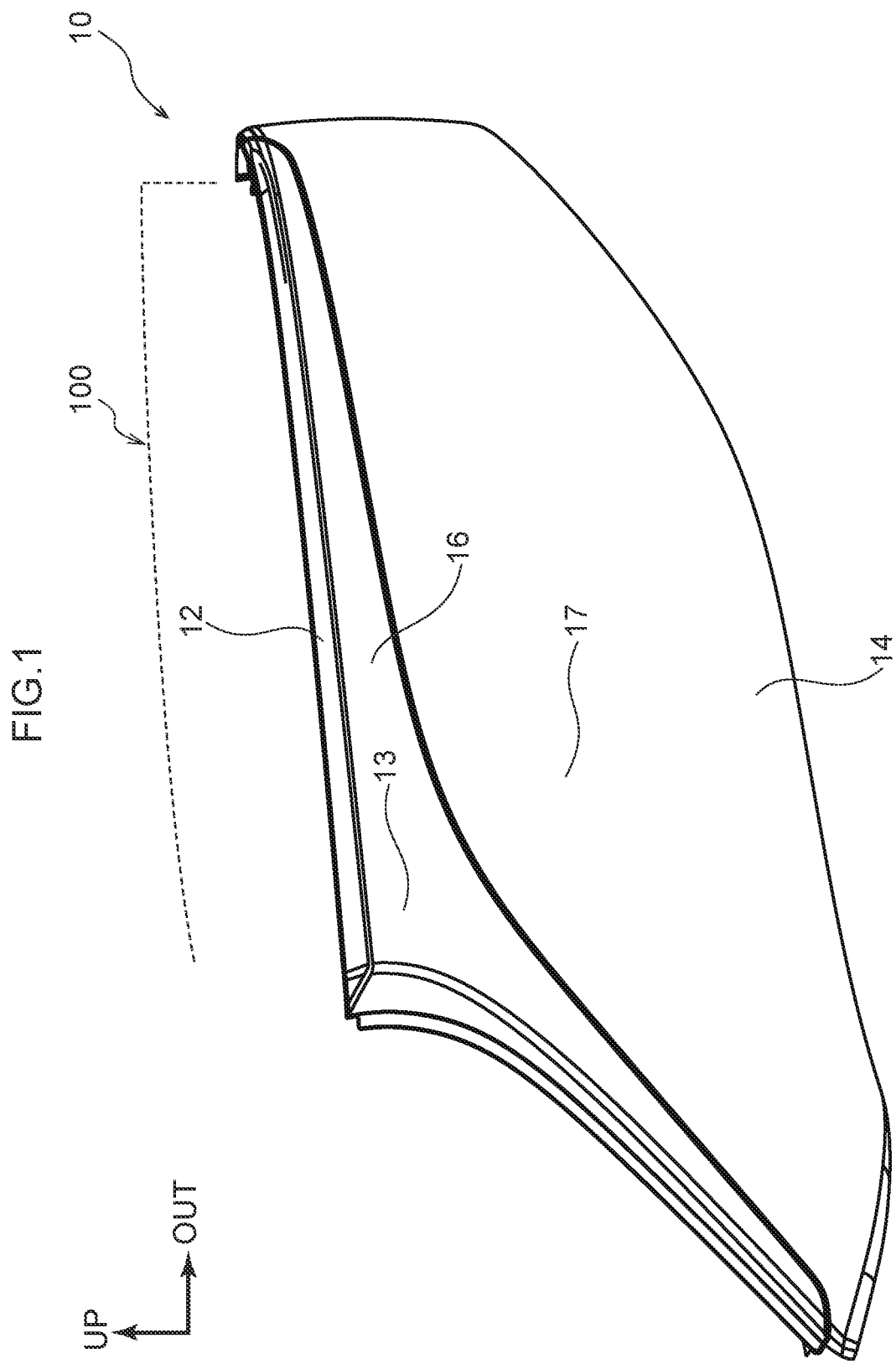
FIG. 1 is a front face view illustrating part of a door mirror casing that includes a door mirror device according to a first exemplary embodiment.

As illustrated in FIG. 1, a door mirror 10 serving as a door mirror device is provided with a plating visor 12 serving as a first cover and a visor cover 14 serving as a second cover that configure portions of a casing (a visor). The plating visor 12 and the visor cover 14 cover a back face side (vehicle front side) of a mirror 100. The entire periphery of the mirror is covered by portions of the casing other than the plating visor 12 and the visor cover 14.

The plating visor 12 is formed in a substantial L-shape in a vehicle face-on view and is configured from resin. At least front surface (outer surface) (the entire periphery in the present exemplary embodiment) of the plating visor 12 is plated. A design face 13 is formed at a vehicle upper side portion of the outer surface of the plating visor 12.

The visor cover 14 is provided alongside a vehicle lower side of the design face 13 of the plating visor 12 (in in-plane (surface) direction of the casing). The visor cover 14 is formed in a substantially rectangular shape in a vehicle face-on view, with its longitudinal direction in the vehicle width direction, and is configured from resin. The front surface (outer surface) of the visor cover 14 is painted. A design face 17 is formed to the outer surface of the visor cover 14.

Figure 4:
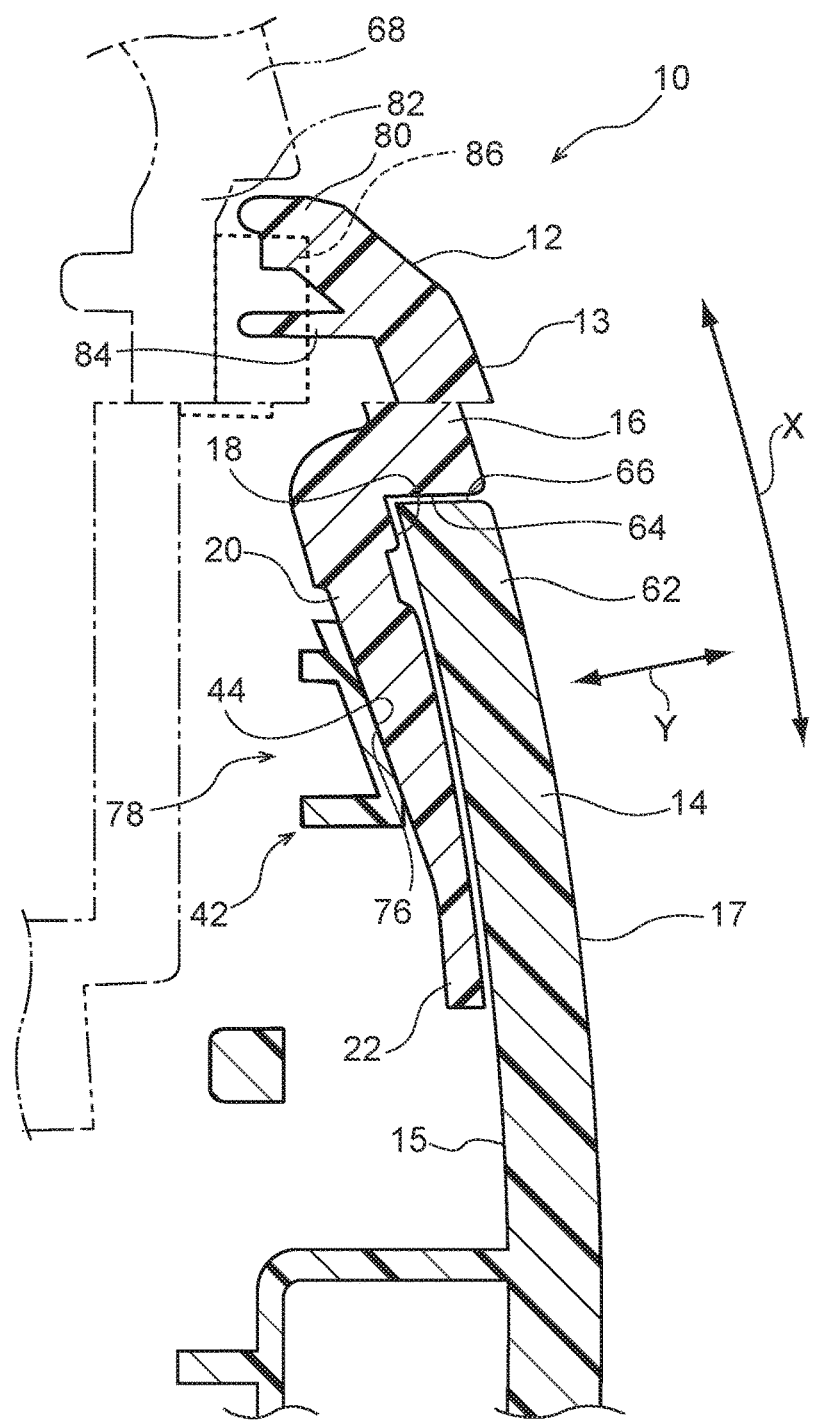
FIG. 4 is an enlarged cross-section illustrating a state sectioned along line A-A in FIG. 2.
Figure 5:
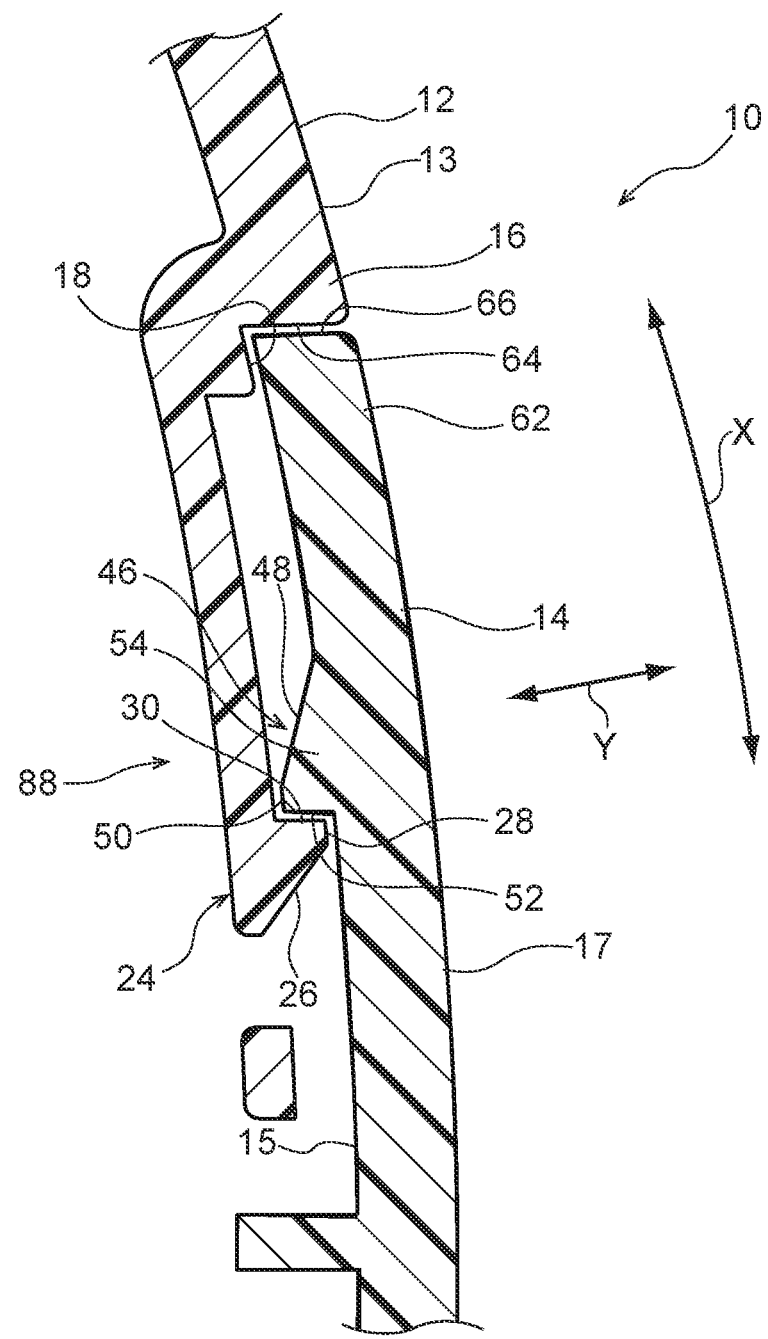
FIG. 5 an enlarged cross-section illustrating a state sectioned along line B-B in FIG. 2.

Note that the in-plane direction of the casing (at a portion of the casing) is a direction which is along a surface of the casing (at the portion of the casing) (see arrows X in FIGS. 4 and 5).

Figure 3:
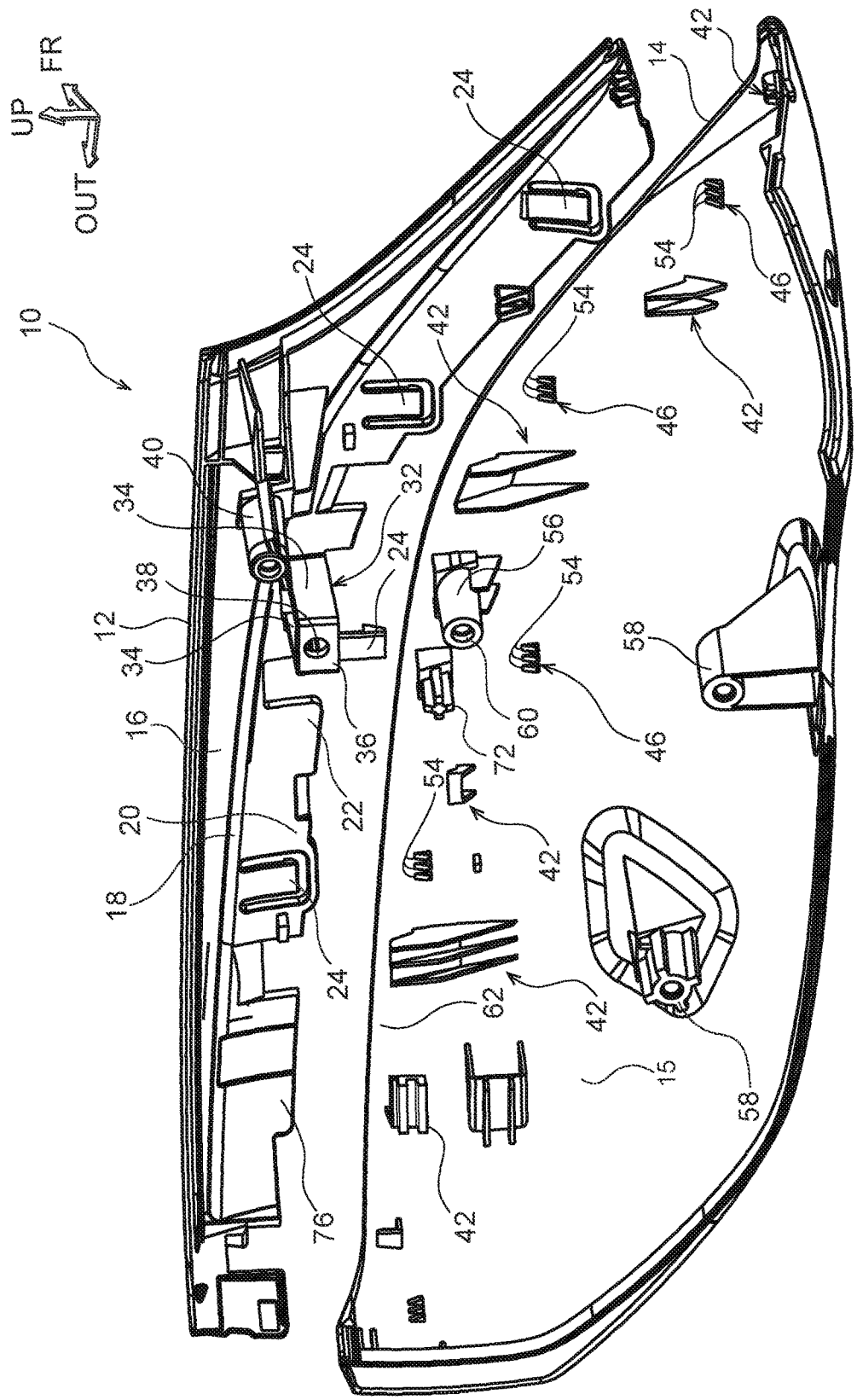
FIG. 3 is an exploded perspective view illustrating part of a door mirror casing that includes a door mirror device according to the first exemplary embodiment.

As illustrated in FIG. 3, an abutting portion 20 is provided at a vehicle lower side portion of the plating visor 12. The abutting portion 20 is provided extending toward substantially the vehicle lower side, along the design face 17 and a back face of the visor cover 14 (in the in-plane direction of the casing). The abutting portion 20 is provided extending substantially in the vehicle width direction along a vehicle upper side portion of the plating visor 12, and the plate thickness of the abutting portion 20 becomes gradually thinner on progression toward a vehicle lower-side end portion 22 (see FIG. 4).

Plural engagement portions 24 (see FIG. 5) are provided at the abutting portion 20. The engagement portions 24 are provided along the visor cover 14 (in the in-plane direction of the casing), extending toward substantially the vehicle lower side. Four, for example, of the engagement portions 24 are provided and the engagement portions 24 are disposed spaced apart from each other along substantially the vehicle width direction. A leading end of each engagement portion 24 is provided with a hook (claw) inclined portion 26. The hook inclined portion 26 is inclined toward an outer side of the door mirror 10 on progression toward the vehicle upper side. Each engagement portion 24A is also provided with a hook (claw) tip portion 28. The hook tip portion 28 is provided extending substantially vertically along the vehicle up-down direction from a vehicle upper-side end portion of the hook inclined portion 26. Each engagement portion 24 is also provided with a hook (claw) horizontal portion 30. The hook horizontal portion 30 is provided extending substantially horizontally toward an inner side of the door mirror 10 from a vehicle upper-side end portion of the hook tip portion 28.

A fastening seat 32 is formed at the substantial longitudinal direction center of the abutting portion 20 of the plating visor 12. The fastening seat 32 is provided with a pair of seat sidewall portions 34. The pair of seat sidewall portions 34 are provided extending from the abutting portion 20 toward the inner side of the door mirror 10. The fastening seat 32 is also provided with a seat wall portion 36. The seat wall portion 36 couples leading end portions of the pair of seat sidewall portions 34 together along the vehicle width direction. The seat wall portion 36 is provided with a fastening hole 38. The fastening hole 38 penetrates the seat wall portion 36 in a plate thickness direction thereof.

A bracket fastening boss 40 is formed at the plating visor 12 at the vehicle width direction inside of the fastening seat 32. The bracket fastening boss 40 is provided extending toward the inner side of the door mirror 10. A bracket, not shown in the drawings, is provided inside the door mirror 10, and a leading end portion of the bracket fastening boss 40 is abutted by the bracket. A fastener, not shown in the drawings, is inserted through a hole in the bracket and the bracket fastening boss 40 and fastened thereto to fix the plating visor 12 to the bracket. The bracket is secured (held) to the vehicle body.

Plural restricting portions 42 are provided at an inner face 15 serving as a back face of the visor cover 14. Six, for example, of the restricting portions 42 are provided to the inner face 15 and the restricting portions 42 are disposed spaced apart from each other along substantially the vehicle width direction. An outer face 44 on the visor cover 14 side of a portion of each restricting portions 42 that faces the visor cover 14 is inclined toward the outside of the door mirror 10 on progression toward the vehicle lower side (see FIG. 4).

Plural catch portions 46 are provided at the inner face 15 of the visor cover 14. Four, for example, of the catch portions 46 are provided, and disposed at positions corresponding to each engagement portion 24 of the plating visor 12. Each catch portion 46 is configured by plural (three in the present exemplary embodiment) catch portion ribs 54 disposed adjacent to one another (see FIGS. 3 and 5). Each catch portion rib 54 is provided with a catch incline portion 48. The catch incline portion 48 is inclined so as to project out toward the inner side of the door mirror 10 on progression toward the vehicle lower side. Each catch portion rib 54 is provided with a catch tip portion 50. The catch tip portion 50 is provided extending substantially vertically from a vehicle lower-side end portion of the catch incline portion 48 toward the vehicle lower side. Each catch portion rib 54 is provided with a catch horizontal portion 52. The catch horizontal portion 52 is provided extending substantially horizontally toward the back face of the visor cover 14 from a vehicle lower-side end portion of the catch tip portion 50.

A turn lamp fastening boss 56 and plural bracket fastening bosses 58 are formed at the inner face 15 of the visor cover 14. The turn lamp fastening boss 56 is provided extending toward the inner side of the door mirror 10 and is disposed inside the fastening seat 32 of the plating visor 12 (see FIG. 2). A fastening hole 60 is formed in the turn lamp fastening boss 56. The fastening hole 60 is disposed at a position corresponding to the fastening hole 38 of the fastening seat 32.

Two, for example, of the bracket fastening bosses 58 are provided at the vehicle lower side portion of the visor cover 14. The bracket fastening bosses 58 are provided extending toward the inner side of the door mirror 10 and the bracket fastening bosses 58 are disposed spaced apart from each other along substantially the vehicle width direction.

Figure 2:
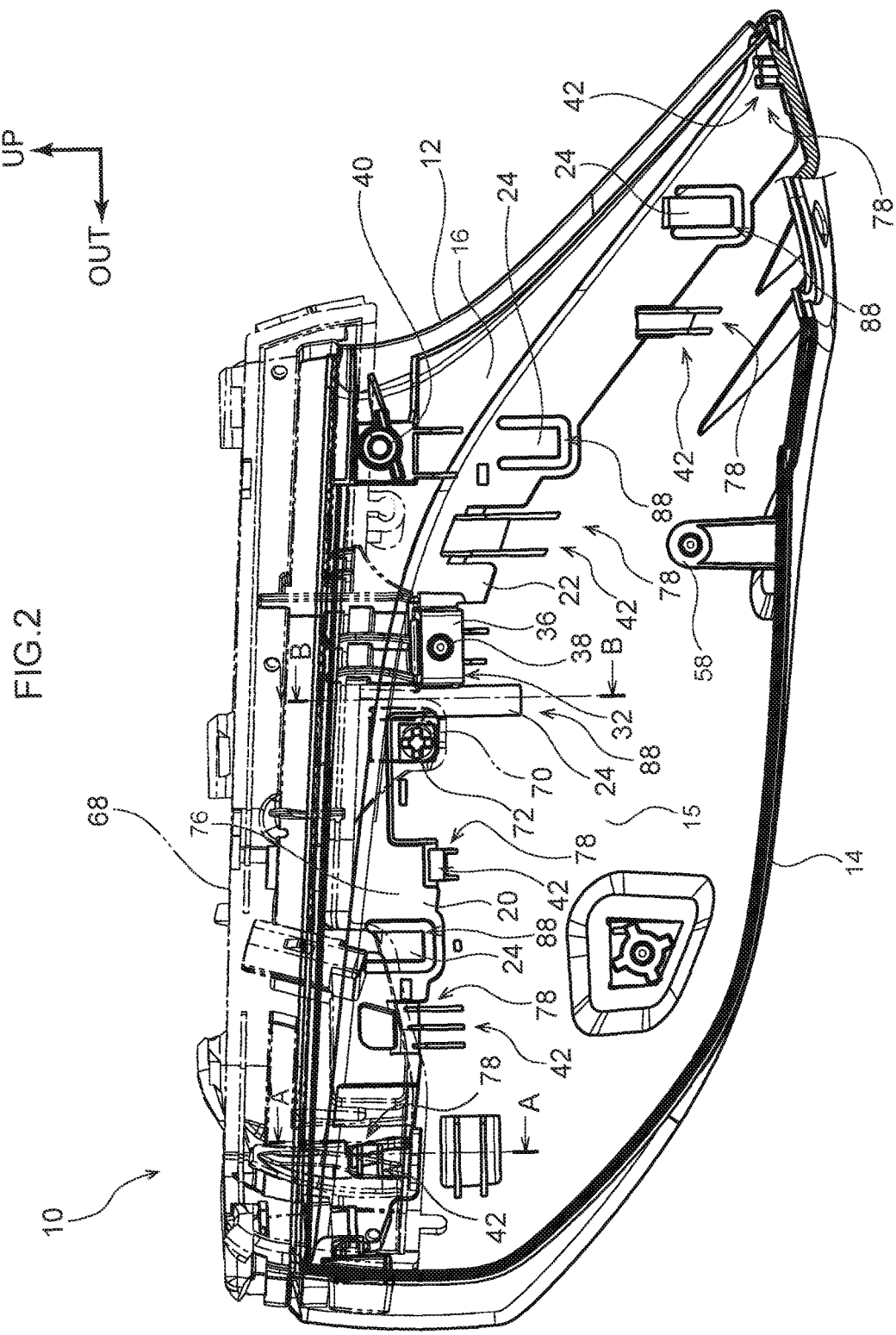
FIG. 2 is a rear face view illustrating part of a door mirror casing that includes a door mirror device according to the first exemplary embodiment.

As illustrated in FIG. 2, the plating visor 12 is attached to the visor cover 14 to form a single body. Specifically, an intermediate portion 16 in the vehicle up-down direction of the plating visor 12 is attached so as to face a vehicle upper-side end portion 62 of the visor cover 14, and a vehicle lower-side end face 64 of the intermediate portion 16 of the plating visor 12 and an end face 66 of the vehicle upper-side end portion 62 of the visor cover 14 are disposed facing each other (see FIG. 4 and FIG. 5). A turn lamp 68 serving as an attachment body is attached to the plating visor 12 and the visor cover 14. Specifically, a positioning rib 72 of the visor cover 14 is inserted into a positioning hole 70 of the turn lamp 68, and a fastener, not shown in the drawings, that has been inserted through a fastening hole, not shown in the drawings, of the turn lamp 68 is fastened to the fastening hole 38 of the fastening seat 32 of the plating visor 12 and the fastening hole 60 of the turn lamp fastening boss 56 of the visor cover 14. The turn lamp 68 is thereby fixed to the plating visor 12 and the visor cover 14. Accordingly, relative movement between the plating visor 12 (the fastening seat 32), the visor cover 14 (the turn lamp fastening boss 56), and the turn lamp 68 (fastening hole) is restricted in the vehicle front-rear direction, the vehicle up-down direction, and the vehicle width direction.

As illustrated in FIG. 4, the abutting portion 20 of the plating visor 12 is disposed between the inner face 15 of the visor cover 14 and the plural restricting portions 42. An inner face 76 that is toward the inside of the door mirror 10 on the abutting portion 20 is abutted by the respective outer faces 44 of the restricting portions 42. Movement of the plating visor 12 (the abutting portion 20) with respect to the visor cover 14 (the restricting portions 42) toward the vehicle front side (in the vehicle front-rear direction (in a plate thickness direction Y of the casing of the visor thereat)) is thereby restricted. Note that portions and members in which the abutting portion 20 is disposed between the respective outer faces 44 of the restricting portions 42 and the inner face 15 of the visor cover 14 configure a first attachment section 78. The abutting portion 20 is separated from the visor cover 14 at locations other than where the abutting portion 20 abuts the restricting portions 42 of the visor cover 14.

A closing portion 18 is integrally formed to the intermediate portion 16 of the plating visor 12. The closing portion 18 is provided at the intermediate portion 16, extending from the intermediate portion 16 at the inner side of the door mirror 10 toward substantially the vehicle lower side, and the closing portion 18 is formed facing the inner face 15 of the vehicle upper-side end portion 62 of the visor cover 14. Note that the closing portion 18 is formed continuously along the entire intermediate portion 16 of the plating visor 12. The closing portion 18 and the inner face 15 of the vehicle upper-side end portion 62 of the visor cover 14 are kept at a substantially constant separation from each other.

A vehicle upper-side end portion 80 of the plating visor 12 is disposed at a position corresponding to a vehicle lower-side end portion 82 of the turn lamp 68. A suppression portion 84 is formed at the vehicle upper-side end portion 80 of the plating visor 12. The suppression portion 84 is provided extending toward the inner side of the door mirror 10, running along the vehicle upper-side end portion 80 in substantially the vehicle width direction. A sealing member 86 serving as an elastic body is attached to the vehicle lower-side end portion 82 of the turn lamp 68. The vehicle upper-side end portion 80 and the suppression portion 84 of the plating visor 12 are abutted by the sealing member 86. The sealing member 86 is, for example, configured from a flexible (softening) material such as an EPT sealer.

Additionally, as illustrated in FIG. 5, the catch portions 46 of the visor cover 14 engage with the engagement portions 24 of the plating visor 12. Specifically, the hook horizontal portion 30 of each engagement portion 24 and the catch horizontal portion 52 of each catch portion 46 abut each other so as to be in engagement. Accordingly, movement of the plating visor 12 (the engagement portions 24) with respect to the visor cover 14 (the catch portions 46) toward the vehicle upper side (in the in-plane direction of the casing of the visor thereat) is stopped. Note that portions and members in which the engagement portions 24 and the catch portions 46 are engaged configure a second attachment section 88. Note that, the hook horizontal portion 30 and the catch horizontal portion 52 are illustrated separated from each other in FIG. 5 in order to facilitate understanding.

The engagement portions 24 are separated from the visor cover 14 at locations other than where the engagement portions 24 engage with the catch portions 46 of the visor cover 14.

Operation and Advantageous Effects of the First Exemplary Embodiment

Explanation follows regarding operation and advantageous effects of the present exemplary embodiment.

In the present exemplary embodiment, the abutting portion 20 of the plating visor 12 in the first attachment section 78 and the engagement portions 24 of the plating visor 12 in the second attachment section 88 are attached to the restricting portions 42 of the visor cover 14 in the first attachment section 78 and the catch portions 46 of the visor cover 14 in the second attachment section 88. Accordingly, movement of the plating visor 12 with respect to the visor cover 14 toward the vehicle rear side is restricted, and movement of the plating visor 12 with respect to the visor cover 14 toward the vehicle upper side is stopped.

Note that the abutting portion 20 and the engagement portions 24 of the plating visor 12 are provided extending along the design face 17 and the back face of the visor cover 14. Accordingly, the amount that the first attachment section 78 and the second attachment section 88 project out inside of the door mirror 10 can be made smaller. This enables the attachment structure to be made small in size.

Moreover, the closing portion 18 of the plating visor 12 closes off the gap between the intermediate portion 16 of the plating visor 12 and the vehicle upper-side end portion 62 of the visor cover 14. Accordingly, as the closing portion 18 between the intermediate portion 16 of the plating visor 12 and the vehicle upper-side end portion 62 of the visor cover 14 appears to be uniform, the area between the intermediate portion 16 of the plating visor 12 and the vehicle upper-side end portion 62 of the visor cover 14 appears to be uniform. This enables reduction in the quality of the external appearance to be suppressed.

Moreover, the plating visor 12 and the visor cover 14 are separated from each other at locations other than at abutting parts of the abutting portion 20 and the restricting portions 42 at which the abutting portion 20 abuts to the restricting portions 42, and at engagement parts of the engagement portions 24 and the catch portions 46 at which the engagement portions 24 engages with the catch portions 46. Accordingly, even when at least one of the plating visor 12 or the visor cover 14 has deformed, at locations other than at abutting parts of the abutting portion 20 to the restricting portions 42 and at engagement parts of the engagement portions 24 with the catch portions 46, mutual interference between the plating visor 12 and the visor cover 14, such that assembly is not possible, can be suppressed. This enables the ease of an assembly operation to be improved.

Additionally, as illustrated in FIG. 4, the suppression portion 84 of the plating visor 12 is abutted by the sealing member 86 of the turn lamp 68. Accordingly, chattering of the plating visor 12 in the vehicle front-rear direction can be suppressed by reaction force (an elastic force) of the sealing member 86. This enables the generation of noise to be suppressed.

Second Exemplary Embodiment

Figure 6:
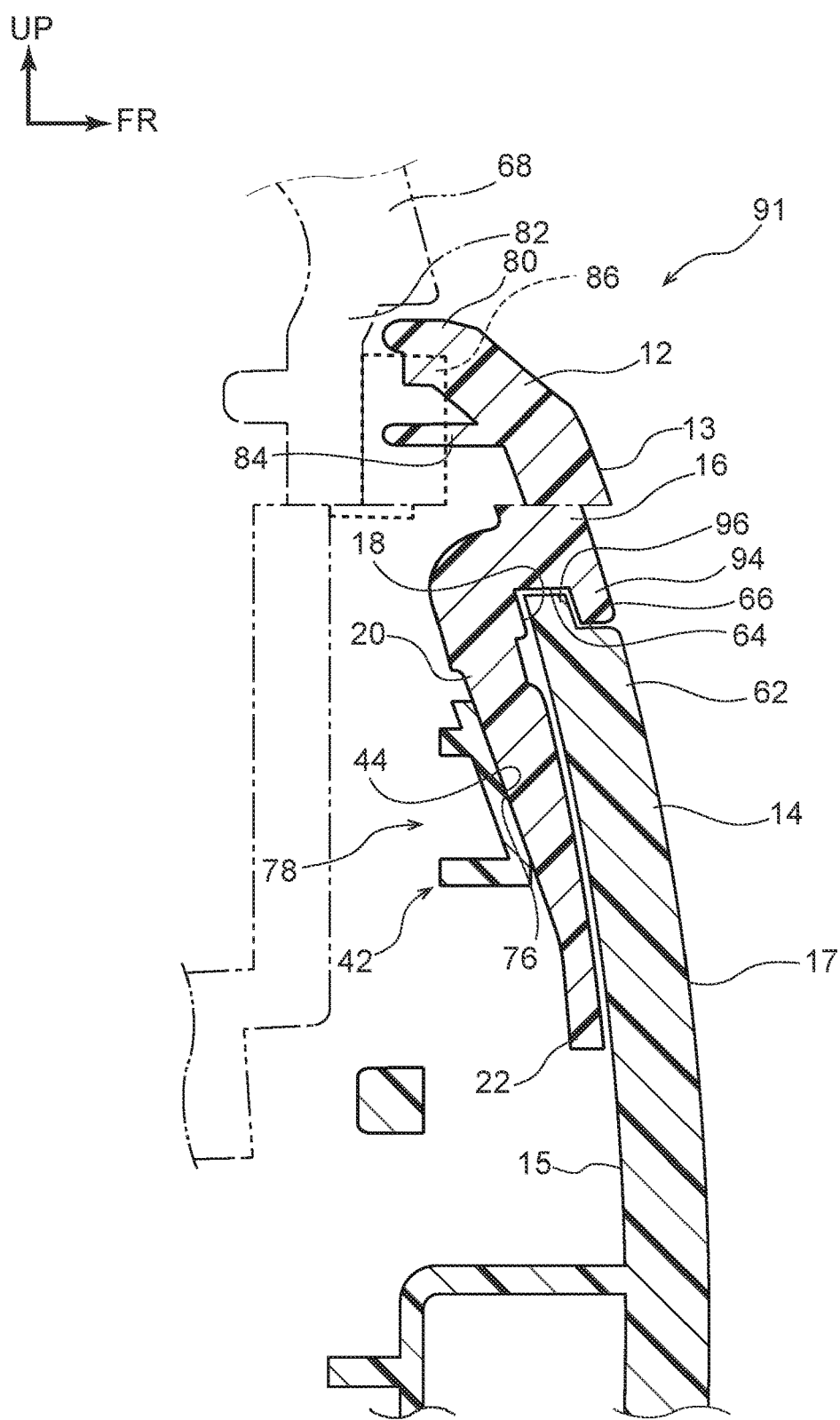
FIG. 6 is an enlarged cross section illustrating part of a door mirror casing that includes a door mirror device according to a second exemplary embodiment, corresponding to FIG. 4.
Figure 7:
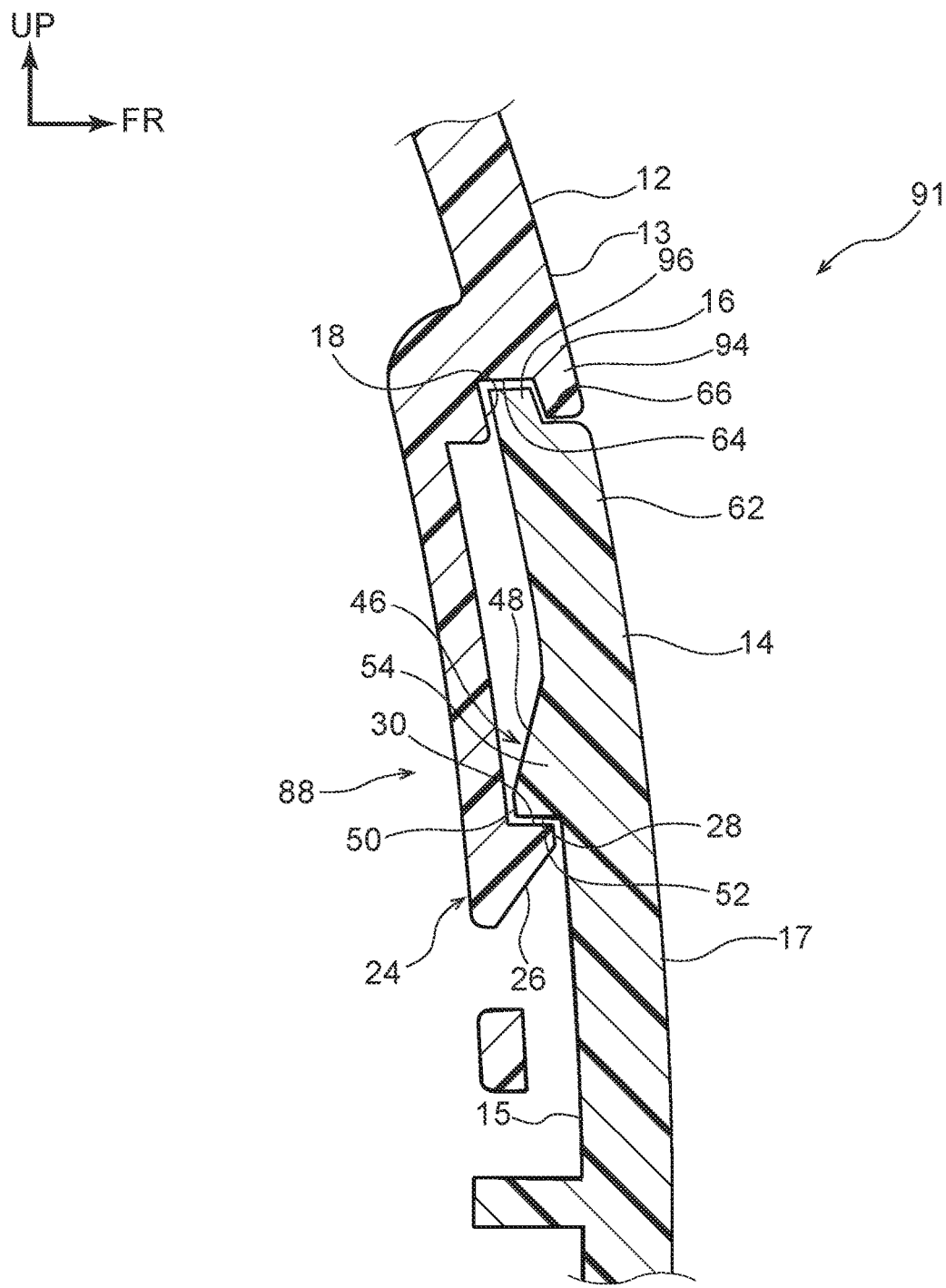
FIG. 7 is an enlarged cross section illustrating part of a door mirror casing that includes a door mirror device according to the second exemplary embodiment, corresponding to FIG. 5.

Explanation follows regarding a door mirror device according to a second exemplary embodiment, with reference to FIG. 6 and FIG. 7. Note that elements with basically the same configuration as that of the first exemplary embodiment described above are appended with the same reference numerals, and explanation thereof is omitted.

As illustrated in FIG. 6 and FIG. 7, the basic configuration of a door mirror 91 serving as a door mirror device according to the second exemplary embodiment is the same as that of the first exemplary embodiment, except in that respective projection portions 94 and 96 are formed to the end face 64 of the intermediate portion 16 of the plating visor 12 and the end face 66 of the vehicle upper-side end portion 62 of the visor cover 14.

Namely, the projection portion 94 is formed at the end face 64 of the intermediate portion 16 of the plating visor 12. The projection portion 94 is provided at the end face 64 at the design face 13 side of the plating visor 12, and is along (follows) the design face 13 of the plating visor 12 and the design face 17 of the visor cover 14 (in the casing in-plane direction) so as to project out toward substantially the vehicle lower side. The projection portion 94 is formed so as to be continuous in substantially the vehicle width direction along the entire intermediate portion 16 of the plating visor 12.

The projection portion 96 is formed at the end face 66 of the vehicle upper-side end portion 62 of the visor cover 14. The projection portion 96 is provided at the end face 66 at the inner face 15 side of the visor cover 14, and is along (follows) the design face 13 of the plating visor 12 and the design face 17 of the visor cover 14 (in the casing in-plane direction) so as to project out toward substantially the vehicle upper side. The projection portion 96 is formed so as to be continuous in substantially the vehicle width direction along the entire vehicle upper-side end portion 62 of the visor cover 14. The projection portion 96 is disposed at the inner side of the door mirror 91 with respect to the projection portion 94 of the plating visor 12. Namely, the projection portion 94 of the plating visor 12 and the projection portion 96 of the visor cover 14 face each other in the vehicle front-rear direction (the plate thickness direction Y of the plating visor 12 and the visor cover 14).

Note that as the above configuration has the same configuration as the door mirror 10 of the first exemplary embodiment except for that the respective projection portions 94 and 96 are formed to the end face 64 of the intermediate portion 16 of the plating visor 12 and the end face 66 of the vehicle upper-side end portion 62 of the visor cover 14, the same advantageous effects as the first exemplary embodiment can be obtained.

The projection portion 94 of the plating visor 12 and the projection portion 96 of the visor cover 14 respectively project out in the vehicle up-down directions, and face each other in the vehicle front-rear direction. Accordingly, it is difficult for wind to flow between the intermediate portion 16 of the plating visor 12 and the vehicle upper-side end portion 62 of the visor cover 14 while the vehicle is traveling, enabling wind noise to be suppressed.

Figure 8:
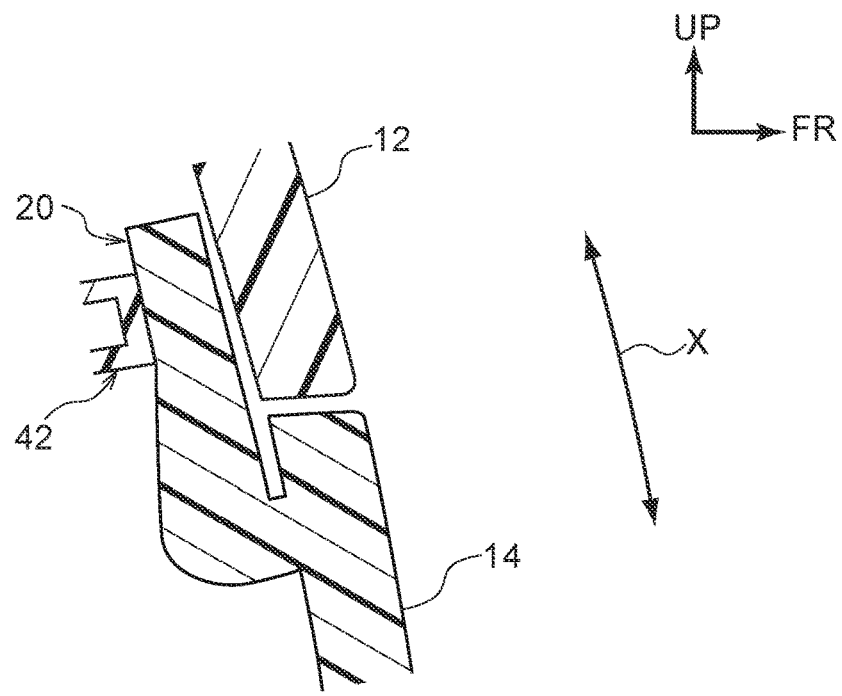
FIG. 8 is a simplified enlarged cross-section illustrating part of a door mirror casing that includes a door mirror device according to a modified example of the first exemplary embodiment.
Figure 9:
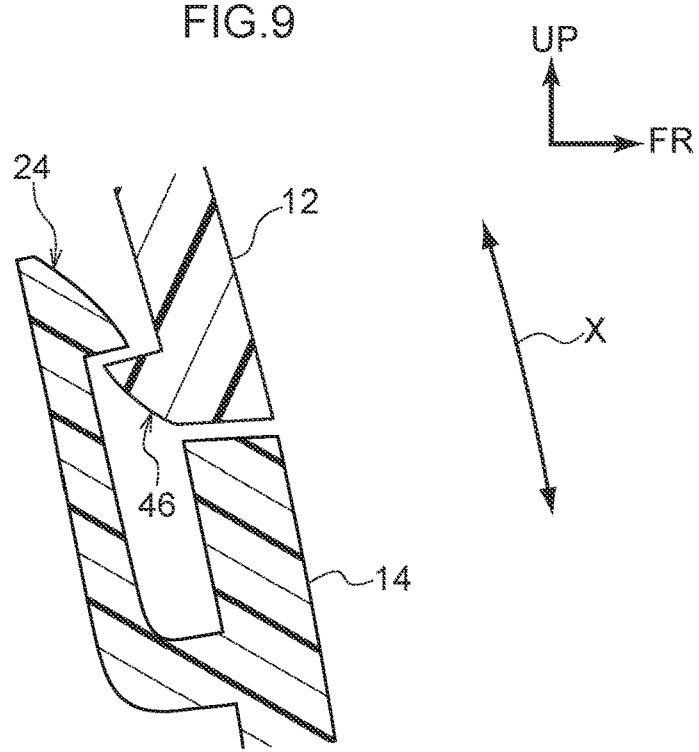
FIG. 9 is a simplified enlarged cross-section illustrating part of a door mirror casing that includes a door mirror device according to the modified example of the first exemplary embodiment.

Note that in the first and second exemplary embodiments described above, although the abutting portion 20 and the engagement portions 24 are formed at the plating visor 12, there is no limitation thereto, and at least one of the abutting portion 20 or the engagement portions 24 may be formed at the visor cover 14. Moreover, although the restricting portions 42 and the catch portions 46 are formed at the visor cover 14, there is no limitation thereto, and at least one of the restricting portions 42 or the catch portions 46 may be formed at the plating visor 12. See FIGS. 8 and 9. Further, although the closing portion 18 is formed at the plating visor 12, there is no limitation thereto, and the closing portion 18 may be formed at the visor cover 14.

Moreover, although the turn lamp 68 is attached to both the plating visor 12 and the visor cover 14, there is no limitation thereto, and the turn lamp 68 may be attached to at least one of the plating visor 12 or the visor cover 14. Further, although the suppression portion 84 is formed at the plating visor 12, there is no limitation thereto, and the suppression portion 84 may be formed at the visor cover 14.

Explanation has been given regarding exemplary embodiments. However, there is no limitation to the above exemplary embodiments, and obviously various other modifications to the above may be implemented within a range not departing from the scope of the above disclosure.

What is claimed is:

1. A door mirror device comprising:
    a first cover that structures a casing covering a mirror provided at a vehicle door;
    a second cover that structures the casing, having an edge that faces an edge of the first cover;
    a first attachment section that is configured to include an abutting portion protruding from the side of the edge of one of the first cover or the second cover so as to extend along an inside surface of the casing, to which the abutting portion faces, and a restricting portion provided at the other of the first cover or the second cover, the restricting portion confining the abutting portion in a plate thickness direction of a plate of the casing such that movement of the first cover with respect to the second cover in the plate thickness direction is restricted; and
    a second attachment section that is configured to include an engagement portion protruding from the edge of one of the first cover or the second cover so as to extend along the inside surface of the casing to which the engagement portion faces, and a catch portion provided at the other of the first cover or the second cover, the catch portion engaging with the engagement portion such that movement of the first cover with respect to the second cover along the inside surface of the casing and in a direction orthogonal to the plate thickness direction is stopped,
    wherein the abutting portion includes:
        an abutting portion-base portion that protrudes from the side of the edge of the one of the first cover or the second cover toward an inner side of the casing, and
        an abutting portion-main body portion that extends from the abutting portion-base portion along the inside surface of the casing in the vicinity of the abutting portion-base portion, and
    wherein the restricting portion includes:
        a restricting portion-base portion that protrudes from the other of the first cover or the second cover toward the inner side of the casing, and
        a restricting portion-main body portion that extends from the restricting portion-base portion such that an outer face of the restricting portion-main body portion faces, in the plate thickness direction at the vicinity of the restricting portion-base portion, an inside surface of the other of the first cover or the second cover in the vicinity of the restricting portion-base portion, and
    wherein
        a space is formed in the plate thickness direction at the vicinity of the restricting portion-base portion between the outer face and the inside surface, and the abutting portion-main body portion is disposed in the space, and the abutting portion-main body portion is arranged between the outer face and the inside surface in the plate thickness direction at the vicinity of the restricting portion-base portion.

2. The door mirror device of claim 1, further comprising a closing portion that is provided at the first cover or the second cover, and that closes an entire gap between the first cover and the second cover along the inside surface of the casing.

3. The door mirror device of claim 1, further comprising projection portions that are respectively provided at the first cover and the second cover, the projection portions projecting from abutting edges of the casing and facing each other in the plate thickness direction of the casing.

4. The door mirror device of claim 2, further comprising projection portions that are respectively provided at the first cover and the second cover, the projection portions projecting from abutting edges of the casing and facing each other in the plate thickness direction of the casing.

5. The door mirror device of claim 1, wherein the first cover and the second cover are separated from each other at locations other than an abutting portion of the abutting portion and the restricting portion and an engaging portion of the engagement portion and the catch portion.

6. The door mirror device of claim 2, wherein the first cover and the second cover are separated from each other at locations other than an abutting portion of the abutting portion and the restricting portion and an engaging portion of the engagement portion and the catch portion.

7. The door mirror device of claim 4, wherein the first cover and the second cover are separated from each other at locations other than an abutting portion of the abutting portion and the restricting portion and an engaging portion of the engagement portion and the catch portion.

8. The door mirror device of claim 1, further comprising: an attachment body that is attached to at least one of the first cover or the second cover, and that is provided with an elastic body; and a suppression portion that is provided at one of the first cover or the second cover, and that is abutted by the elastic body.

9. The door mirror device of claim 2, further comprising: an attachment body that is attached to at least one of the first cover or the second cover, and that is provided with an elastic body; and a suppression portion that is provided at one of the first cover or the second cover, and that is abutted by the elastic body.

10. The door mirror device of claim 7, further comprising: an attachment body that is attached to at least one of the first cover or the second cover, and that is provided with an elastic body; and a suppression portion that is provided at one of the first cover or the second cover, and that is abutted by the elastic body.

11. The door mirror device of claim 1, wherein
    the engagement portion includes an engaging part and the catch portion includes a catching part,
    the engaging part and the catching part face along the inside surface of the casing, to which the engagement portion faces, and are configured to engage with each other such that the movement of the first cover with respect to the second cover along the inside surface of the casing, to which the engagement portion faces, is stopped.

12. The door mirror device of claim 1, wherein the abutting portion-main body portion is structured to include:
    a base portion that is connected to the abutting portion-base portion;

a distal end, and an intermediate portion that is connected to and between the base end portion and the distal end, and wherein only the intermediate portion is arranged between the outer face and the inside surface in the plate thickness direction at the vicinity of the restricting portion-base portion, such that the intermediate portion is confined between the outer face and the inside surface in the plate thickness direction at the vicinity of the restricting-base portion.

13. The door mirror device of claim 1, wherein an outside surface of the first cover is exposed to an outside of the door mirror device, and an outside surface of the second cover is exposed to the outside of the door mirror device.

14. A door mirror device comprising:

a first cover that structures a casing covering a mirror provided at a vehicle door;

a second cover that structures the casing, having an edge that faces an edge of the first cover;

a first attachment section that is configured to include an abutting portion protruding from the side of the edge of one of the first cover or the second cover so as to extend along an inside surface of the casing, to which the abutting portion faces, and a restricting portion provided at the other of the first cover or the second cover, the restricting portion confining the abutting portion in a plate thickness direction of a plate of the casing such that movement of the first cover with respect to the second cover in the plate thickness direction is restricted; and a second attachment section that is configured to include an engagement portion protruding from the edge of one of the first cover or the second cover so as to extend along the inside surface of the casing to which the engagement portion faces, and a catch portion provided at the other of the first cover or the second cover, the catch portion engaging with the engagement portion such that movement of the first cover with respect to the second cover along the inside surface of the casing and in a direction orthogonal to the plate thickness direction is stopped, wherein an outside surface of the first cover is exposed to an outside of the door mirror device, and an outside surface of the second cover is exposed to the outside of the door mirror device.

\* \* \* \* \*